No. 752,036. PATENTED FEB. 16, 1904.
M. D. COMPTON.
PREPAYMENT APPARATUS.
APPLICATION FILED OCT. 22, 1901.
NO MODEL. 2 SHEETS—SHEET 1.

Witnesses
Edward L. Copland

Inventor
Melvin D. Compton
By his Attorney
Augustus B. Stoughton

No. 752,036. PATENTED FEB. 16, 1904.
M. D. COMPTON.
PREPAYMENT APPARATUS.
APPLICATION FILED OCT. 22, 1901.
NO MODEL. 2 SHEETS—SHEET 2.

Witnesses
Inventor
Melvin D Compton
By his Attorney
Augustus B Stoughton

No. 752,036.

Patented February 16, 1904.

UNITED STATES PATENT OFFICE.

MELVIN D. COMPTON, OF NEW YORK, N. Y.

PREPAYMENT APPARATUS.

SPECIFICATION forming part of Letters Patent No. 752,036, dated February 16, 1904.

Application filed October 22, 1901. Serial No. 79,503. (No model.)

*To all whom it may concern:*

Be it known that I, MELVIN D. COMPTON, a citizen of the United States, residing at the city of New York, in the county of New York and State of New York, have invented a certain new and useful Prepayment Apparatus, of which the following is a specification.

One object of the present invention is to provide for furnishing the service of an electric fan, heater, or suitable electric translating device upon the deposition of a coin of appropriate denomination for paying for its use for a predetermined period of time.

To this and other ends hereinafter set forth, the invention, stated in general terms, comprises an electric translating device, as a fan, a circuit maker and breaker for the circuit of said device, a motor and its accessories for operating said maker and breaker, a coin-controlled lever for starting and stopping said motor, and a cam connected with said motor and arranged to hold said lever out of position for stopping the motor during its revolution; and the invention further comprises the improvements hereinafter described and claimed.

The nature, characteristic features, and scope of my invention will be more fully undestood from the following description, taken in connection with the accompanying drawings, forming part hereof, and in which—

Figure 1:
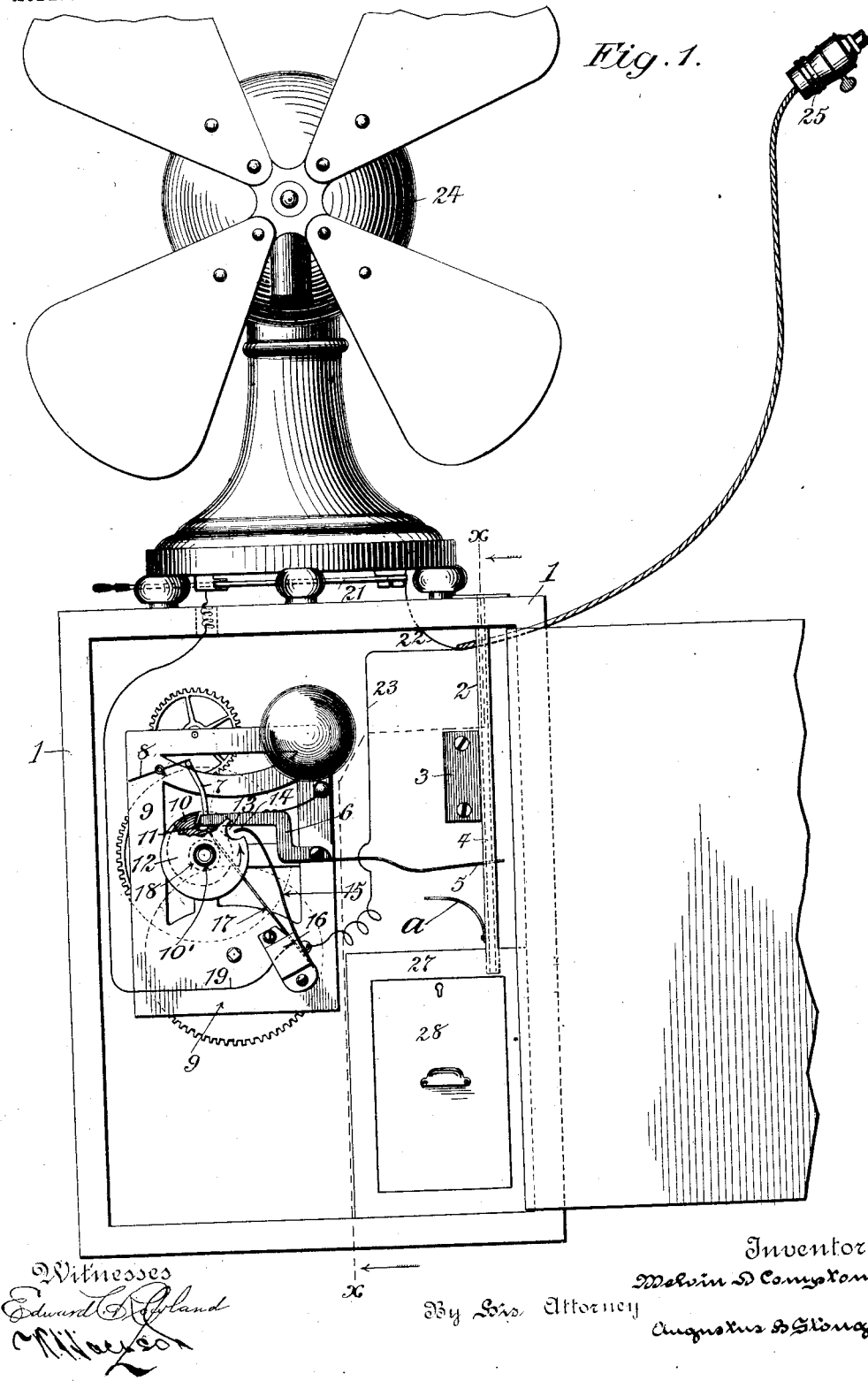
Figure 2:
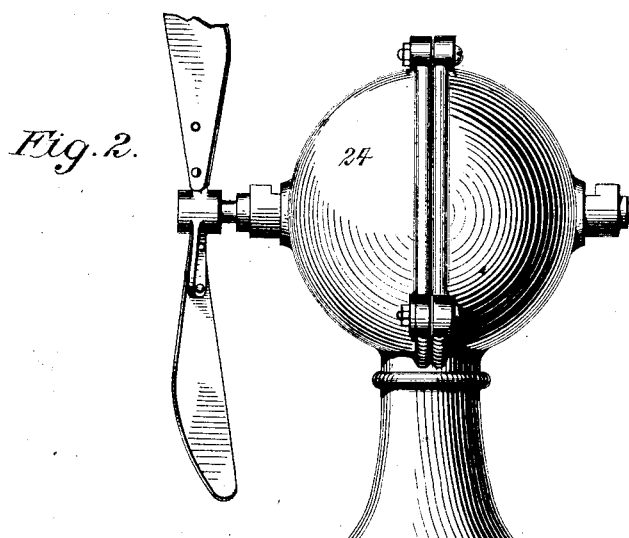
Figure 3:
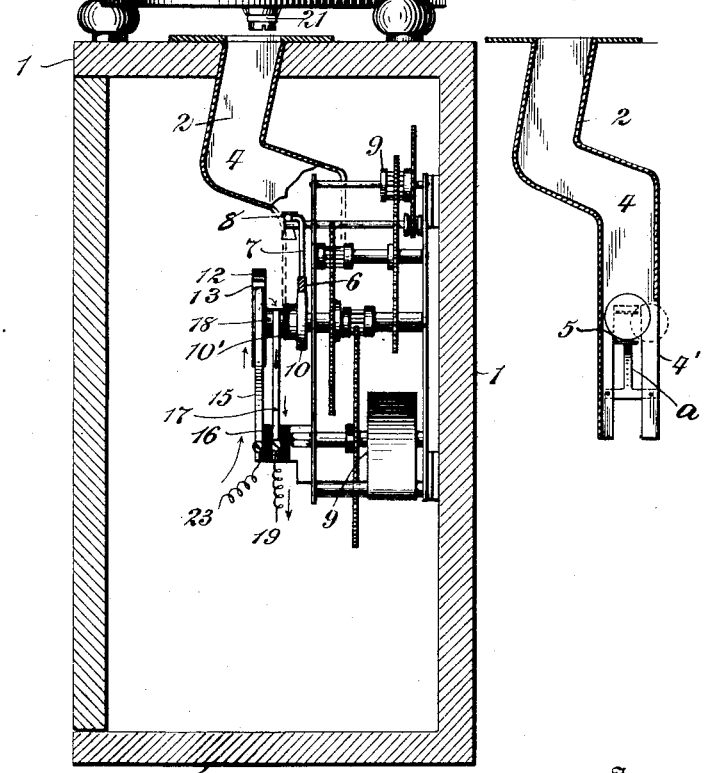

Figure 1 is a front view illustrating a device embodying features of the invention and showing the casing open. Fig. 2 is a sectional view taken on the line $xx$ of Fig. 1, and Fig. 3 is a sectional view taken through the coin-chute.

In the drawings, 1 is a pedestal or housing upon which is arranged the electric fan 24, which may be provided, if desired, with the usual lever 21 and contacts 22 for controlling its speed.

2 is a coin-chute which extends through the housing 1, and which may be supported, as at 3, and offset, as at 4, to prevent the machine from being tampered with by means of wires and the like. One of the side walls of the chute is cut away, as at 4', for a purpose to be presently described, and the end of the chute is slotted, as shown in Fig. 3.

There is a circuit maker and breaker which comprises a pair of disks 12 and 18, connected together and to their shafts and insulated from the latter, as at 10'. The disk 12 is peripherally notched, as at 13. The rest of the circuit maker and breaker comprises the contact-springs 15 and 17, insulated from each other, as by the block 16, and arranged to bear upon the peripheries of the disks 12 and 18, respectively. There is a motor 9, supported as by a framework, and, as shown, this motor comprises a spring and a suitable train of gears arranged to turn the circuit maker and breaker disks. To retard the turning of these disks, a fan 8 is provided. Mounted so as to turn with the disks 12 and 18 there is a cam 10, which is of generally convolute shape and is notched below both its high and low peripheral surfaces, as shown.

6 is a coin-lever pivotally supported at or near its center. It is fitted or provided with a toe 11, adapted to coöperate with the notch in the cam and with the peripheral surface of the cam, as will be hereinafter described. This lever 6 is also provided with an arm 7, adapted to arrest and release the fan 8, and with a tail 5, which works in the slot in the chute 2, as shown, for example, in Fig. 3.

$a$ is a spring back-stop for the lever 6, and the lever is also shown as provided with a hammer for striking a bell, the latter being shown in Fig. 1, but omitted in Fig. 2.

The circuit for the fan is from the source of current, which may, for example, be the socket 25 by way of the conductor 23 to the contact 15 and thence when the contact 15 is not opposite the slot 13, but rests on the periphery of the disk 12, to the latter and from thence by the disk 18 to the contact 17 to the conductor 19, thence through the fan-driving mechanism and by the conductor 22 back to the source.

27 is a coin-receptacle, which may be provided with a locked door 28.

The mode of operation of the described apparatus may be explained as follows: A coin is deposited in the chute 2 and falls upon the tail 5 of the lever 6. The weight of this coin will turn the tail of the lever downward and shift the toe 11 clear of the notch in the cam 10. At the same time the arm 7 releases the fan, and the motor slowly starts. If the coin should be smaller in diameter than the diameter of the coin intended to be used, it will fall out through the space 4', Fig. 3, as shown by dotted lines, because the space 4' and the spring $a$ are properly proportioned for this purpose. As soon as the undersized coin falls out, which it does immediately, the toe 11 falls back into its notch and the arm 7 arrests the motor before the circuit has been closed through the fan. However, if the coin is of proper size, it will turn the lever 6 into contact with the spring $a$, but will not escape through the chute, but will remain there, as shown by the full lines in Fig. 3. Under such circumstances the arm 7 will clear the fan 8, so that the motor will start up, the toe 11 riding upon the face of the cam 10. The running of the motor brings the periphery of the disk 12 into contact with the arm or part 15, thus closing the circuit through the fan and permitting it to run. The fan will run while the disk 12 makes a complete revolution, or practically so. During this revolution the toe 11 travels on the face of the cam 10, which by reason of its convolute form gradually lifts the toe and depresses the tail 5, overcoming the spring $a$ and permitting the coin to fall into the coin-receptacle. As the cam finishes a revolution the toe 11 falls into its notch, and thus brings the arm 7 into the position for stopping the motor. At the same time the hammer, when present, strikes the bell, thus giving notice. When the motor is stopped, the part 15 is opposite the notch in the disk 12, so that the circuit is broken at that point, and the fan is therefore brought to rest. The size of the fan 8 will determine the time required for one revolution of the cam 10, and consequently the time during which the fan is running, and this time is of course made proportional to the value of the coin by which the mechanism is released.

It will be obvious to those skilled in the art to which my invention appertains that modifications may be made in details—for example, in the selection of a heater or other electric translating device instead of the fan—without departing from the spirit thereof. Hence I do not limit myself to the precise construction and arrangement of parts hereinabove set forth and illustrated in the accompanying drawings; but,

Having thus described the nature and objects of my invention, what I claim as new, and desire to secure by Letters Patent, is—

In a prepayment apparatus, the combination of an electric translating device and its circuit, a circuit maker and breaker, a motor for the circuit maker and breaker, a convolute-shaped cam having a notch and operatively connected with the motor, a coin-chute having a slot and a lateral coin-opening, a pivotal coin-lever adapted to coöperate with said cam and having a tail which works in said slot, and a movable back-stop for said lever mounted in relation to said lateral coin-opening to eject undersized coins, substantially as described.

In testimony whereof I have hereunto signed my name.

MELVIN D. COMPTON.

In presence of—
W. J. JACKSON,
FRANK T. KALAS.